(12) United States Patent
Gomes

(10) Patent No.: US 8,375,008 B1
(45) Date of Patent: Feb. 12, 2013

(54) METHOD AND SYSTEM FOR ENTERPRISE-WIDE RETENTION OF DIGITAL OR ELECTRONIC DATA

(76) Inventor: Robert Gomes, Austin, TX (US)

(*) Notice: Subject to any disclaimer, the term of this patent is extended or adjusted under 35 U.S.C. 154(b) by 1025 days.

(21) Appl. No.: 10/759,622

(22) Filed: Jan. 16, 2004

Related U.S. Application Data

(63) Continuation-in-part of application No. 10/697,728, filed on Oct. 30, 2003, now abandoned.

(60) Provisional application No. 60/440,855, filed on Jan. 17, 2003, provisional application No. 60/440,728, filed on Jan. 17, 2003.

(51) Int. Cl.
 *G06F 7/00* (2006.01)
(52) U.S. Cl. .................. 707/694; 707/825
(58) Field of Classification Search .......... 707/1–104.1, 707/200, 204, 687, 694
 See application file for complete search history.

(56) References Cited

U.S. PATENT DOCUMENTS

| | | | |
|---|---|---|---|
| 4,706,212 A | 11/1987 | Toma | |
| 5,107,419 A | 4/1992 | MacPhail | |
| 5,278,980 A | 1/1994 | Pedersen et al. | |
| 5,350,303 A | 9/1994 | Fox et al. | |
| 5,535,121 A | 7/1996 | Roche et al. | |
| 5,535,381 A | 7/1996 | Kopper | |
| 5,617,566 A | 4/1997 | Malcolm | |
| 5,644,774 A | 7/1997 | Fukumochi et al. | |
| 5,687,384 A | 11/1997 | Nagase | |
| 5,689,699 A | 11/1997 | Howell et al. | |
| 5,717,913 A | 2/1998 | Driscoll | |
| 5,732,265 A | 3/1998 | Dewitt et al. | |
| 5,742,807 A | 4/1998 | Masinter | |
| 5,778,395 A | 7/1998 | Whiting et al. | |
| 5,813,009 A | 9/1998 | Johnson et al. | |
| 5,813,015 A | 9/1998 | Pascoe | |
| 5,926,811 A | 7/1999 | Miller et al. | |
| 5,937,401 A | 8/1999 | Hillegas | |
| 5,982,370 A | 11/1999 | Kamper | |
| 6,006,221 A | 12/1999 | Liddy et al. | |
| 6,023,710 A | 2/2000 | Steiner et al. | |
| 6,047,294 A | 4/2000 | Deshayes et al. | |
| 6,125,371 A | 9/2000 | Bohannon et al. | |
| 6,157,931 A | 12/2000 | Cane et al. | |

(Continued)

FOREIGN PATENT DOCUMENTS

| | | |
|---|---|---|
| EP | 1967972 A1 | 9/2008 |
| JP | 2003303194 A | 10/2003 |

(Continued)

OTHER PUBLICATIONS

Amati, G. et al.; "Probabilistic Models of Information Retreival Based on Measuring the Divergence from Randomness"; ACM Transactions on Information Systems, vol. 20, No. 4. Oct. 2002.

(Continued)

*Primary Examiner* — James Trujillo
*Assistant Examiner* — Linh Black
(74) *Attorney, Agent, or Firm* — Berry & Associates P.C.

(57) ABSTRACT

A method and system for managing data can be used to provide a comprehensive solution to retaining electronic data within an enterprise. Data may come from backup tapes or a network. Email files may be separated from other files on the backup tape. Data from the email files may be extracted and fed to a collective database. The other files (from the file backup tapes) and data from the network are processed by a de-duplication engine to remove duplicates of the content while keeping metadata from each copy of the content. The content and metadata are forwarded to the collective database. Filters or other rules may be applied to the collective database to identify compliant or targeted data. Many different operations can then be performed on the compliant and targeted data.

47 Claims, 6 Drawing Sheets

U.S. PATENT DOCUMENTS

| | | |
|---|---|---|
| 6,182,029 B1 | 1/2001 | Friedman |
| 6,189,002 B1 | 2/2001 | Roitblat |
| 6,199,067 B1 | 3/2001 | Geller |
| 6,199,081 B1 | 3/2001 | Meyerzon et al. |
| 6,216,123 B1 | 4/2001 | Robertson et al. |
| 6,226,630 B1 | 5/2001 | Billmers |
| 6,226,759 B1 | 5/2001 | Miller et al. |
| 6,240,409 B1 | 5/2001 | Aiken |
| 6,243,713 B1 | 6/2001 | Nelson et al. .................. 1/1 |
| 6,256,633 B1 | 7/2001 | Dharap |
| 6,269,382 B1 | 7/2001 | Cabrera et al. |
| 6,278,992 B1* | 8/2001 | Curtis et al. .................. 707/3 |
| 6,324,548 B1 | 11/2001 | Sorenson |
| 6,389,403 B1 | 5/2002 | Dorak |
| 6,393,389 B1 | 5/2002 | Chanod et al. |
| 6,408,266 B1 | 6/2002 | Oon |
| 6,421,767 B1 | 7/2002 | Milillo et al. |
| 6,453,280 B1 | 9/2002 | Yang |
| 6,477,544 B1 | 11/2002 | Bolosky et al. |
| 6,493,711 B1 | 12/2002 | Jeffrey |
| 6,662,198 B2 | 12/2003 | Satyanarayanan et al. ......... 1/1 |
| 6,708,165 B2 | 3/2004 | Jeffrey |
| 6,745,197 B2 | 6/2004 | McDonald |
| 6,751,628 B2 | 6/2004 | Coady |
| 6,778,979 B2 | 8/2004 | Grefenstette et al. |
| 6,810,395 B1 | 10/2004 | Bharat |
| 6,834,110 B1 | 12/2004 | Marconcini et al. |
| 6,859,800 B1 | 2/2005 | Roche et al. |
| 6,915,435 B1 | 7/2005 | Merriam |
| 6,928,526 B1* | 8/2005 | Zhu et al. .................. 711/154 |
| 6,947,954 B2 | 9/2005 | Cohen et al. |
| 6,952,737 B1 | 10/2005 | Coates et al. |
| 6,954,750 B2 | 10/2005 | Bradford .................. 1/1 |
| 6,996,580 B2 | 2/2006 | Bae et al. |
| 7,047,386 B1 | 5/2006 | Ngai et al. |
| 7,089,286 B1 | 8/2006 | Malik |
| 7,137,065 B1 | 11/2006 | Huang et al. |
| 7,146,388 B2 | 12/2006 | Stakutis et al. |
| 7,158,970 B2 | 1/2007 | Chang et al. |
| 7,174,368 B2 | 2/2007 | Ross, Jr. .................. 709/207 |
| 7,260,568 B2 | 8/2007 | Zhang et al. |
| 7,269,564 B1 | 9/2007 | Milsted et al. |
| 7,284,191 B2* | 10/2007 | Grefenstette et al. ......... 715/230 |
| 7,287,025 B2 | 10/2007 | Wen et al. |
| 7,313,556 B2 | 12/2007 | Gallivan et al. |
| 7,325,041 B2 | 1/2008 | Hara et al. |
| 7,458,082 B1 | 11/2008 | Slaughter et al. ......... 719/328 |
| 7,478,113 B1 | 1/2009 | De Spiegeleer et al. |
| 7,526,478 B2 | 4/2009 | Friedman |
| 7,533,291 B2 | 5/2009 | Lin |
| 7,650,341 B1 | 1/2010 | Oratovsky et al. |
| 7,860,706 B2 | 12/2010 | Abir |
| 8,095,516 B2 | 1/2012 | Margolus et al. |
| 2002/0002468 A1 | 1/2002 | Spagna et al. |
| 2002/0019814 A1 | 2/2002 | Ganesan |
| 2002/0038296 A1* | 3/2002 | Margolus et al. ......... 707/1 |
| 2002/0059317 A1 | 5/2002 | Black et al. |
| 2002/0107803 A1 | 8/2002 | Lisanke et al. |
| 2002/0107877 A1* | 8/2002 | Whiting et al. ......... 707/204 |
| 2002/0116402 A1 | 8/2002 | Luke |
| 2002/0120925 A1 | 8/2002 | Logan |
| 2002/0138376 A1* | 9/2002 | Hinkle .................. 705/30 |
| 2002/0140960 A1 | 10/2002 | Ishikawa |
| 2002/0143737 A1 | 10/2002 | Seki et al. |
| 2002/0143871 A1 | 10/2002 | Meyer et al. |
| 2002/0147733 A1 | 10/2002 | Gold et al. |
| 2002/0161745 A1 | 10/2002 | Call .................. 707/1 |
| 2002/0178176 A1 | 11/2002 | Sekiguchi et al. |
| 2002/0193986 A1 | 12/2002 | Schirris |
| 2002/0194324 A1* | 12/2002 | Guha .................. 709/223 |
| 2003/0028889 A1* | 2/2003 | McCoskey et al. ......... 725/91 |
| 2003/0069803 A1 | 4/2003 | Pollitt |
| 2003/0069877 A1* | 4/2003 | Grefenstette et al. ......... 707/2 |
| 2003/0093790 A1 | 5/2003 | Logan et al. |
| 2003/0105718 A1 | 6/2003 | Hurtado et al. |
| 2003/0110130 A1 | 6/2003 | Pelletier |
| 2003/0126247 A1 | 7/2003 | Strasser et al. |
| 2003/0126362 A1 | 7/2003 | Camble et al. |
| 2003/0135464 A1 | 7/2003 | Mourad et al. |
| 2003/0145209 A1 | 7/2003 | Eagle et al. |
| 2003/0182304 A1 | 9/2003 | Summerlin et al. |
| 2003/0233455 A1 | 12/2003 | Leber et al. |
| 2004/0003132 A1 | 1/2004 | Stanley et al. |
| 2004/0034550 A1 | 2/2004 | Menschik et al. |
| 2004/0034632 A1 | 2/2004 | Carmel et al. |
| 2004/0054630 A1* | 3/2004 | Ginter et al. .................. 705/53 |
| 2004/0064447 A1 | 4/2004 | Simske et al. |
| 2004/0064537 A1 | 4/2004 | Anderson et al. |
| 2004/0068604 A1 | 4/2004 | Le et al. |
| 2004/0083211 A1 | 4/2004 | Bradford .................. 707/3 |
| 2004/0143609 A1 | 7/2004 | Gardner et al. |
| 2004/0158559 A1 | 8/2004 | Poltorak .................. 707/3 |
| 2004/0168058 A1 | 8/2004 | Margolus |
| 2004/0186827 A1 | 9/2004 | Anick et al. |
| 2004/0193695 A1 | 9/2004 | Salo et al. |
| 2004/0205448 A1* | 10/2004 | Grefenstette et al. ......... 715/500 |
| 2005/0076293 A1 | 4/2005 | Beresnevichiene |
| 2005/0097081 A1 | 5/2005 | Sellen et al. |
| 2005/0097092 A1 | 5/2005 | Annau et al. |
| 2005/0114282 A1 | 5/2005 | Todhunter |
| 2005/0114370 A1 | 5/2005 | Lewak et al. |
| 2005/0144157 A1 | 6/2005 | Moody et al. |
| 2005/0160481 A1 | 7/2005 | Todd et al. |
| 2005/0223067 A1 | 10/2005 | Buchheit et al. |
| 2005/0234843 A1 | 10/2005 | Beckius et al. |
| 2005/0283473 A1 | 12/2005 | Rousso et al. |
| 2006/0026220 A1 | 2/2006 | Margolus |
| 2006/0122998 A1 | 6/2006 | Bar-Yossef et al. |
| 2006/0167679 A1 | 7/2006 | Tsai et al. |
| 2006/0167842 A1 | 7/2006 | Watson .................. 707/3 |
| 2006/0173824 A1 | 8/2006 | Bensky et al. |
| 2006/0230035 A1 | 10/2006 | Bailey et al. |
| 2006/0265209 A1 | 11/2006 | Bradford |
| 2006/0271526 A1 | 11/2006 | Charnock et al. |
| 2007/0011154 A1 | 1/2007 | Musgrove et al. |
| 2007/0022134 A1 | 1/2007 | Zhou et al. |
| 2007/0030528 A1 | 2/2007 | Quaeler et al. |
| 2007/0033177 A1 | 2/2007 | Friedman |
| 2007/0033183 A1 | 2/2007 | Friedman |
| 2007/0033410 A1 | 2/2007 | Eagle et al. .................. 713/176 |
| 2007/0038616 A1 | 2/2007 | Guha |
| 2007/0050339 A1 | 3/2007 | Kasperski et al. .................. 707/3 |
| 2007/0050351 A1 | 3/2007 | Kasperski et al. .................. 707/4 |
| 2007/0061335 A1 | 3/2007 | Ramer et al. |
| 2007/0088687 A1 | 4/2007 | Bromm et al. |
| 2007/0192284 A1 | 8/2007 | Finley et al. |
| 2007/0198470 A1 | 8/2007 | Freedman et al. |
| 2007/0233692 A1 | 10/2007 | Lisa et al. |
| 2007/0245108 A1 | 10/2007 | Yasaki et al. |
| 2007/0253643 A1 | 11/2007 | Nagarajan |
| 2007/0255686 A1 | 11/2007 | Kemp et al. |
| 2007/0266009 A1 | 11/2007 | Williams |
| 2007/0282811 A1 | 12/2007 | Musgrove |
| 2007/0282826 A1 | 12/2007 | Hoeber et al. |
| 2007/0288445 A1 | 12/2007 | Kraftsow |
| 2007/0288450 A1 | 12/2007 | Datta et al. |
| 2008/0005651 A1 | 1/2008 | Grefenstette et al. |
| 2008/0059187 A1 | 3/2008 | Roitblat et al. |
| 2008/0059512 A1 | 3/2008 | Roitblat et al. |
| 2008/0077570 A1 | 3/2008 | Tang et al. |
| 2008/0097975 A1 | 4/2008 | Guay et al. |
| 2008/0104032 A1 | 5/2008 | Sarkar |
| 2008/0133570 A1 | 6/2008 | Allen et al. |
| 2008/0147644 A1 | 6/2008 | Aridor et al. |
| 2008/0155192 A1 | 6/2008 | Iitsuka |
| 2008/0162498 A1 | 7/2008 | Omoigui |
| 2008/0189273 A1 | 8/2008 | Kraftsow et al. |
| 2008/0195601 A1 | 8/2008 | Ntoulas et al. |
| 2008/0235202 A1 | 9/2008 | Wang et al. |
| 2008/0288474 A1 | 11/2008 | Chin et al. |
| 2009/0024612 A1 | 1/2009 | Tang et al. |
| 2009/0182737 A1 | 7/2009 | Melman |
| 2009/0182789 A1 | 7/2009 | Sandorfi et al. |
| 2009/0287685 A1 | 11/2009 | Charnock et al. |
| 2009/0313248 A1 | 12/2009 | Balachandran et al. |
| 2009/0327625 A1 | 12/2009 | Jaquette et al. |

FOREIGN PATENT DOCUMENTS

| | | |
|---|---|---|
| JP | 2004213237 A | 7/2004 |
| WO | WO 03/019412 A2 | 3/2003 |
| WO | WO 2008/080140 A2 | 7/2008 |

OTHER PUBLICATIONS

Attar et al., "Local Feedback in Full-Text Retrieval Systems", Journal of the ACM (JACM), vol. 24, Issue 3 (Jul. 1977), pp. 397-417, ISSN:0004-5411.

Cai et al., "Automatic Query Expansion Based on Directed Divergence", Proceedings of the International Conference on Information Technology: Coding and Computing, p. 8, 2002, ISBN:0-7695-1506-1.

Cohen, E. et al.; "Processing Top k Queries from Samples"; ACM.

Conlon, S., "Automatic Web Searching and Categorizing Using Query Expansion and Focusing", (Mississippi University.), 6p, Jan. 2003.

Crestani, F. et al.; "Is This Document Relevant? . . . Probably": A Survey of Probabilistic Models in Information Retrieval; ACM Computing Surveys vol. 30, No. 4, Dec. 1998.

E. M. Voorhees, "Query expansion using lexical-semantic relations", Annual ACM Conference on Research and Development in Information Retrieval, Proceedings of the 17th annual international ACM SIGIR conference on Research and development in information retrieval, 1994, Dublin, Ireland, Aug. 1994, pp. 61-69, ISBN:0-387-1988-X.

Gauch et al., "A Corpus Analysis Approach for Automatic Query Expansion and Its Extension to Multiple Databases" *ACM Transactions on Information Systems*, vol. 17, No. 3, Jul. 1999, pp. 250-269.

Gehler, P. et al.; "The Rate Adapting Poisson Model for Information Retrieval and Object Recognition"; Proceedings of the 23rd International Conference on Machine Learning, 2006.

http://www.googleguide.com/tools.html <retrieved on Jul. 8, 2009>.

http://www.lexisnexis.com/toolbar/help/using.htm#HighlightAndClick <retrieved on Jul. 8, 2009>.

Ilyas, I. et al.; "Adaptive Rank-Aware Query Optimization in Relational Databases"; ACM Transactions on Database Systems; vol. 31. No. 4, Dec. 2006.

Luk, R. et al.; "A Comparison of Chinese Document Indexing Strategies and Retrieval Models"; ACM Transactions on Asian Language Information Processing, vol. 1, No. 3, Sep. 2002.

Margulis, E.; "Modelling Documents with Multiple Poisson Distributions"; Information Processing & Management vol. 29, No. 2, 1993.

Margulis, E.; "N-Poisson Document Modelling"; SIGIR '92.

Mei, Q. et al.; "A Study of Poisson Query Generation Model for Information Retrieval"; SIGIR '07 Proceedings, Session 12: Formal Models.

Mitra et al., "Improving Automatic Query Expansion", Annual ACM Conference on Research and Development in Information Retrieval, Proceedings of the 21st annual international ACM SIGIR conference on Research and development in information retrieval, Melbourne, Australia, pp. 206-214, Year of Publication: 1998, ISBN:1-58113-015-5.

Ozmutlu, H. et al.; "Analysis of large data logs: an application of Poisson sampling on excite web queries"; Information Processing and Management, vol. 38, 2002.

Robertson, S. et al.; "Some Simple Effective Approximations to the 2-Poisson Model for Probabilistic Weighted Retreival"; Centre for Interactive Systems Research, London.

Roelleke, T.; "A Frequency-based and a Poisson-based Definition of the Probability of Being Informative"; SIGIR '03.

Tao, Y. et al.; "Indexing Multi-Dimensional Uncertain Data with Arbitrary Probability Density Functions"; Proceedings of the 31st VLDB Conference, Norway 2005.

Volkmer et al., "Exploring Automatic Query Refinement for Text-Based Video Retrieval", *IEEE International Conference on Multimedia and Expo*, Jul. 9-12, 2006, pp. 765-768, Toronto, Ont., ISBN: 1-4244-0366-7.

Xu et al., "Query expansion using local and global document analysis," in Proc. of ACM-SIGIR 1996, Zurich, Switzerland, Aug. 18-22, 1996, pp. 4-11.

Yan, T. et al.; "The SIFT Information Dissemination System"; ACM Transactions on Database Systems, vol. 24, No. 4, Dec. 1999.

Zakariah, R. et al.; "Detecting Junk Mails by Implementing Statistical Theory"; IEEE Proceedings of the 20th International Conference on Advanced Information Networking and Applications, 2006.

Roitblat, Herbert L. (2004), "Electronic Data Are Increasingly Important to Successful Litigation", Trends in Electronic Data.

Roitblat, Herbert L. (2005), "Document Retrieval", DolphinSearch, Inc.

"The Sedona Principles: Best Practices Recommendations & Principles for Addressing Electronic Document Production," *The Sedona Conference Working Group Series*, Jul. 2005 Version.

Meng, W., et al., "Building Efficient and Effective Metasearch Engines," *ACM Computing Surveys*, ACM, New York, NY, US, US, vol. 34, No. 1, Mar. 1, 2002, pp. 48-89.

Comparing IBM Tivoli Storage Manager and VERITAS NetBackup in Real-World Environments. A summary by IBM of the whitepaper and benchmark written by Progressive Strategies, Nov. 8, 2002.

Beyond Backup Toward Storage Management by M. Kaczmarski, T. Jiang and D.A. Pease. IBM Systems Journal, vol. 42, pp. 322-337, Nov. 2, 2003.

PCT Search Report and Written Opinion dated Jun. 18, 2008, PCT/US07/13483.

PCT Search Report and Written Opinion dated May 8, 2009, PCT/US2009/032990.

Mosher, Sue, "Outlook Tips and Techniques," Windows IT Pro, Feb. 12, 2001.

International Search Report and Written Opinion from PCT/US2010/060899 dated Mar. 3, 2011.

International Search Report and Written Opinion from PCT/US2010/059775 dated Mar. 16, 2011.

International Search Report and Written Opinion from PCT/US11/22472 dated Mar. 30, 2011.

International Search Report and Written Opinion from PCT/US11/26924 dated Apr. 29, 2011.

\* cited by examiner

METHOD AND SYSTEM FOR ENTERPRISE-WIDE RETENTION OF DIGITAL OR ELECTRONIC DATA

RELATED APPLICATIONS

This application claims priority under 35 U.S.C. §119(e) to U.S. Patent Application Nos. 60/440,855 entitled "System and Method for Data Extraction in a Non-Native Environment, Data De-Duplication, Database Creation and Manipulation, Image Back-up and PST File Monitoring" by Gardner et al. filed Jan. 17, 2003, and 60/440,728 entitled "Method and System for Enterprise-Wide Retention of Digital or Electronic Data" by Robert Gomes filed Jan. 17, 2003. This application claims priority under 35 U.S.C. §120 to and is a continuation-in-part of U.S. patent application Ser. No. 10/697,728, entitled "System and Method for Data Extraction in a Non-Native Environment" by Gardner et al. filed Oct. 30, 2003 now abandoned. This application is related to U.S. patent application Ser. Nos. 10/759,663, entitled "System and Method for Data Extraction from Email Files" by Gardner et al. filed on Jan. 16, 2004, 10/759,599, entitled "System and Method for Data De-Duplication" by Gardner et al. filed on Jan. 16, 2004, 10/759,623, entitled "System and Method for a Data Extraction and Backup Database" by Gardner et al. filed on Jan. 16, 2004, 10/759,643 entitled "Method and System for Forensic Imaging to Virtual Media" by Gardner et al. filed on Jan. 16, 2004, and 10/760,010 entitled "System and Method of Monitoring a Personal Folder File" by Gardner et al. filed on Jan. 16, 2004.

FIELD OF THE INVENTION

The invention relates in general to method and systems of managing data, and more particularly, to methods and systems of managing data on an enterprise-wide level.

DESCRIPTION OF THE RELATED ART

Many enterprises are finding managing data on an enterprise-wide basis difficult. In addition, some data management issues have competing concerns, such as data storage and backup (with a goal of backing up electronic data), data recovery (with a goal of recovering stored electronic information) and information retention policies (with a goal of selectively eliminating electronic information according to defined retention parameters).

Typical backup systems store large amounts of information on many tapes (tape drive electronic data storage devices). In such systems, there are usually many copies of the same content stored, potentially on multiple tapes. Prior attempts at reducing the number of copies of a record, such as an electronic file, have included manually examining the file or some other human intervention. With large amounts of data for an enterprise, manually checking for copies becomes nearly impossible. In addition, these conventional electronic data back-up systems (e.g., tape back-up systems) do not include a mechanism to apply a data retention policy to the electronic information that is backed up in order to selectively place compliant data on the backup tape without placing non-compliant data on the tape.

SUMMARY

A method and system for managing data can be used to provide a comprehensive solution to retain (or store or process) electronic data within an enterprise. Electronic data may come from backup tapes or a network (or other sources). A file extraction engine can separate files, by extension or introspection, (e.g., email files from other files) extracted from backup tape(s) or other media. The email files can be processed by an email extraction engine with the extracted data fed to a collective database and simultaneously de-duplicated, including de-duplication of attachments, message bodies and metadata. The other electronic data files (from the file extraction engine) and data from backup tapes or a network (or other sources) can be processed by a de-duplication engine to remove duplicates of the content while keeping metadata from each unique location of the copy(s) of the content. Also, file content can be de-duplicated such that only one copy of the content is in the database regardless of the location of the file (e.g., an email attachment, a loose file, a re-named file with no change to the content). The content and metadata are forwarded to a collective database. Filters or other rules may be applied to the collective database to filter and/or identify targeted data. The targeted data may be stored on tapes (or other electronic storage media), outputted to a "mini database", produced for a legal discovery request, forwarded for internal intelligence gathering, build a specialized database (on a particular subject or matter) deleted in accordance with data retention policies, or many other different applications as a user may determine.

The method and system allow for the processing of data on an enterprise-wide basis. The method and system can also be used without having to recreate original environments in which the data was generated. Further, the method and system help to reduce or eliminate duplicate files, message bodies and metadata within a collective database. By having fewer files, less storage space is needed and quicker searches can be performed.

In one set of embodiments, a system and method of managing information within an enterprise can comprise extracting data from backup tapes or a network (or other sources), collecting the data within a database, and identifying compliant data or targeted data within the database using a rule. The rule may be a data retention policy, filter, business rule, query, other policy, or the like.

In another set of embodiments, a system and method of managing information within an enterprise can comprise extracting data from backup tapes or a network (or other sources) (and in one embodiment from at least two different types of data sources) and collecting the data within a database. Examples of different types of data sources can include backup tapes and a network.

In further sets of embodiments, computer readable media can comprise code that includes instructions for carrying out the methods and may be used on the systems.

The foregoing general description and the following detailed description are exemplary and explanatory only and are not restrictive of the invention.

BRIEF DESCRIPTION OF THE DRAWINGS

The present invention is illustrated by way of example and not limitation in the accompanying figures.

Figure 1:
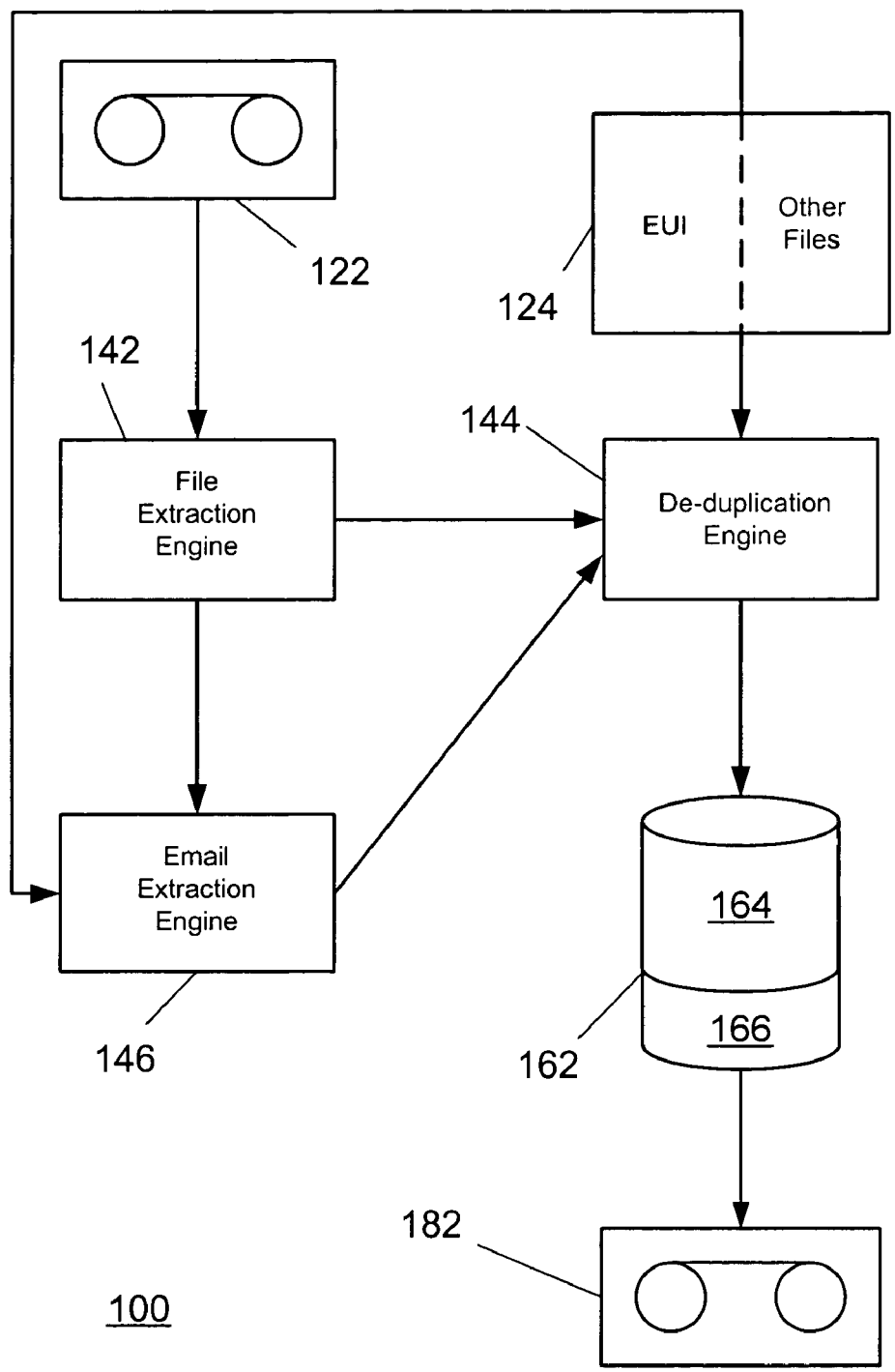
FIG. 1 includes an illustration of a system for managing electronic data for an enterprise in accordance with an embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

A method and system for managing data can provide a comprehensive solution to retain electronic data within an enterprise. This data may come from backup systems (e.g., backup tape systems) or a network (or other sources). In one embodiment, a file extraction engine can separate email files from other files (e.g., extracted from the backup tape). Email files may be processed by an email extraction engine 146 with the extracted data fed to a collective database. In one embodiment, the other files (from the file extraction engine) and data from the network can be processed by a de-duplication engine to remove duplicates of the content while keeping metadata for each copy of the content. The email content, data content and the associated metadata can all be sorted in the collective database. Filters or other rules may be applied to the collective database to identify targeted data. The targeted data may be stored on tapes, produced for a legal discovery request, forwarded for internal intelligence gathering, build a specialized database (on a particular subject or matter) deleted in accordance with data retention policies, or many other different applications as a user may determine.

The method and system are highly beneficial because it allows for the processing of data on an enterprise-wide basis. The method and system can also be used without having to recreate original environments in which the data was generated. Further, the method and system help to reduce duplicate files within a collective database. By having fewer files, less storage space is needed and quicker searches can be performed. These benefits and potentially others may occur in one some or all of the embodiments of the present invention.

Before describing the system and method in more detail, a few terms are defined or clarified to aid in understanding the descriptions that follows. As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited to only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

The term "rule" is intended to mean at least part of logical operation that is used to segregate data. Rules may be referred to as filters, business rules, queries, policies, and the like.

The term "tape" is used generally to describe any form of electronic storage media from which electronic data can be retrieved. The term "backup tape" is used to refer to a tape used to store backup data or information. Backup tapes are not limited only to tape drives, and can include hard disk drives, CD-ROMs, flash cards, or other persistent data storage medium.

FIG. 1 illustrates one embodiment of system 100 that can be used to manage electronic data within an enterprise. Two sources of original data can include conventional backup tape(s) 122 and network 124 for the enterprise. Data on network 124 can include both End-User Information ("EUI") and other files and data as shown in FIG. 1. EUI may include nearly any information generated or collected by users of computers (not shown) that may be backed up by network 124. The other files may include applications used to generate the EUI, such as accounting programs, engineering validation programs, word processing programs, and the like.

System 100 can further comprise file extraction engine 142, de-duplication engine 144, email extraction engine 146, collective database 162, and backup tape(s) 182, each of which is addressed below. File extraction engine 142 is coupled to backup tape(s) 122 and can separate email files from other files. Email extraction engine 146 is coupled to file extraction engine 142 and can extract data regarding the email without the need of recreating email accounts. De-duplication engine 144 is coupled electronically to network 124, file extraction engine 142 and email extraction engine 146 and can save one copy of content for a file and metadata for each file. Such metadata may include information regarding which computers (not shown in FIG. 1) on which copies of the file can be found. Collective database 162, into which data is stored (e.g., including targeted data 166 and compliant data 164 and metadata), is coupled electronically to de-duplication engine 144 (and may be, in alternative embodiments, electronically connected to email extraction engine 146 or file extraction engine 142 or both). The distinction between targeted data 166 and compliant data 164 is described later in this specification. The system can further comprise backup tape 182 is coupled electronically to collective database 162 and may include at least a portion of data from collective database 162. If FIG. 1, arrows illustrate the principle direction of data flow in system 100. After reading this specification, skilled artisans will appreciate that the various components can be uni-directionally or bi-directionally coupled to one another.

The components shown in FIG. 1 may be operated by one or more computers. Each of the computers can comprise a central processing unit ("CPU"), a read-only memory ("ROM"), a random access memory ("RAM"), a hard drive ("HD") or storage memory, and I/Os. I/Os can include a keyboard, monitor, printer, electronic pointing device (e.g., mouse, trackball, stylus, etc.), or the like. Each of the computers may have more than one CPU, ROM, RAM, HD, I/O, or other hardware components.

Portions of the methods described herein may be implemented using a computer program that can operate on one or more computers. The computer program can include code that comprises instructions to carry out the method described herein. The computer program may be stored on a tangible medium, such as ROM, RAM, HD, a DASD array, magnetic tape, floppy diskette, optical storage device, or other appropriate computer readable medium.

In an illustrative embodiment of the invention, the computer-executable instructions may be lines of assembly code, compiled C, C++, Java, or other language code. Other architectures may be used. For example, the functions of any one of the computers may be performed by a different computer. Additionally, a computer program or its software components with such code may be embodied in more than one computer.

Figure 2:
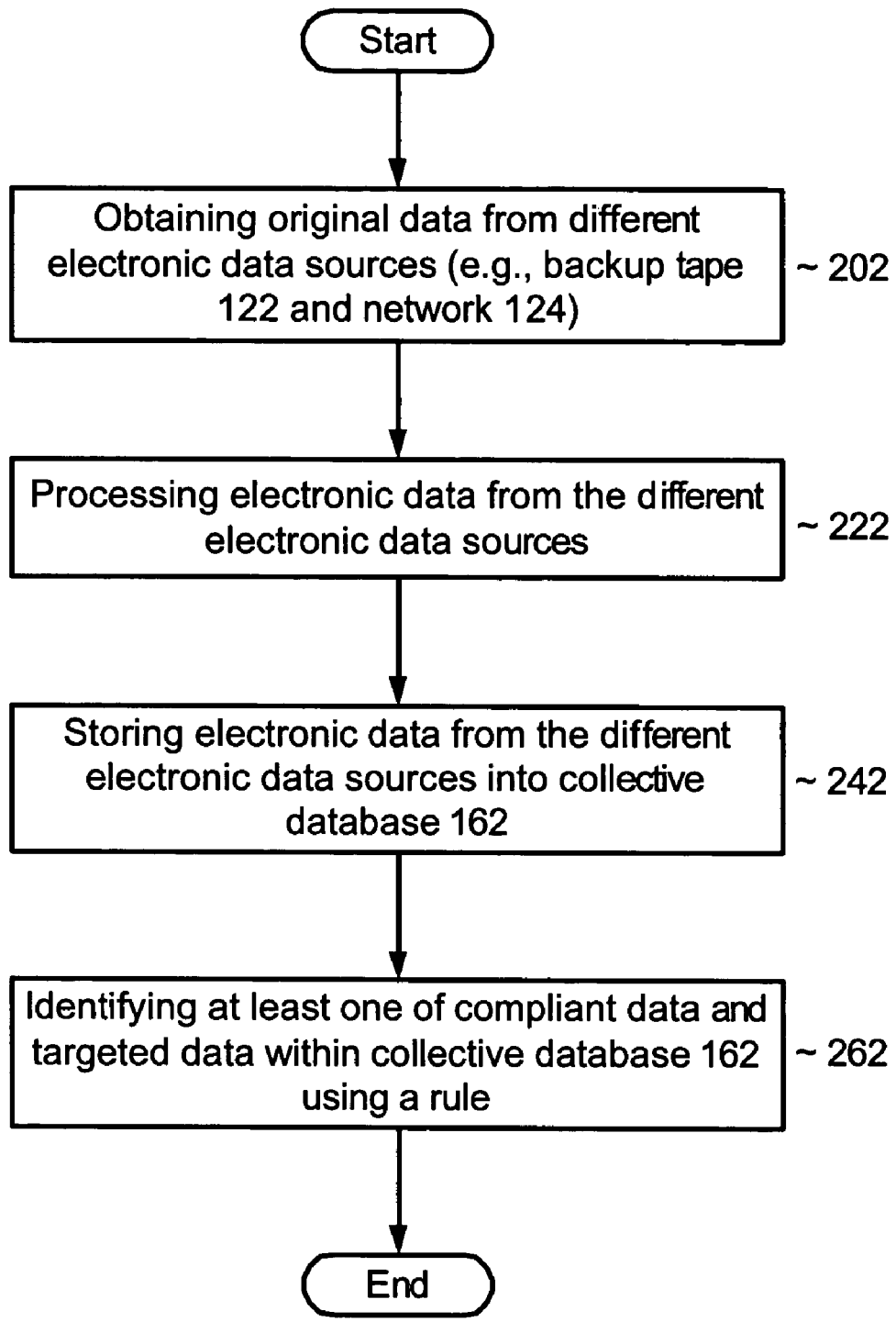
FIG. 2 includes a flow diagram of a method of managing electronic data within an enterprise in accordance with an embodiment of the present invention.

Attention is now directed to one embodiment of a method of managing data as illustrated in FIG. 2 for an enterprise using embodiments of system 100. FIGS. 3-6 include a more detailed process flow for a specific application of the method illustrated in FIG. 2.

FIG. 2 illustrates includes a flow diagram of a method of managing electronic data within an enterprise in accordance with one embodiment of the present invention. In the embodiment illustrated in FIG. 2, the method can include obtaining original data from different electronic data sources (e.g., backup tape 122 and network 124) at step 202. Information may originate from one or both of an existing, conventional backup system (e.g., to obtain backed up data/information from backup tape 122) and network 124 (e.g., to obtain "current" data/information via network 124). The method can also include processing electronic data from the different electronic data sources at step 222. Many different types of processing are possible, and referring to FIG. 1, such processing may be performed by file extraction engine 142, de-duplication engine 144, email extraction engine 146, a database server (not shown) coupled to collective database 162, or any combination thereof.

Continuing with the embodiment illustrated in FIG. 2, the method can include storing electronic data from the different electronic data sources into collective database 162 at step 242. The method can further include identifying at least one of compliant data and targeted data within collective database 162 using a rule at step 262. In one specific application of the embodiment, the method can be used to maintain collective database 162 (containing a collection of data/information from backup tapes 122 and network 124), from which new backup tapes 182 may be generated. After an initial gathering of electronic data within collective database 162, network 124 can be accessed for periodic (e.g., daily, weekly, monthly, or the like) or occasional backups.

Note that not all of the activities described herein are required, that a limitation within a specific activity may not be required, and that further activities may be performed in addition to those illustrated (e.g., intelligence gathering, responding to a production request, or the like). Also, some of the activities may be performed substantially simultaneously during with other activities. After reading this specification, skilled artisans will be capable of determining what activities can be used for their specific needs.

The embodiment within FIG. 2 is described in more detail with respect to a specific implementation as described with reference to FIGS. 3-6 with reference to system 100 as shown in FIG. 1. The method can be used to initially migrate information from an existing, conventional backup system (e.g., backup tapes 122) and to obtain "current" information from network 124 to maintain collective database 162, from which new backups (e.g., backup tapes 182) may be made.

Initially, original electronic data may reside on backup tapes 122, network 124, or both. Data on network 124 can include both EUI and other files as previously described and shown in FIG. 1. For network 124, EUI will be the focus of the method, although in other embodiments, all files on network 124 may be examined.

The method has two different starting points depending on whether original electronic data is coming from backup tape 122 or network 124. Note that information from both sources may be used with the method simultaneously. Original electronic data from backup tape 122 may be processed by file extraction engine 142 and email extraction engine 146, whereas EUI from network 124 may or may not be processed by file extraction engine 142 and email extraction engine 146.

Figure 3:
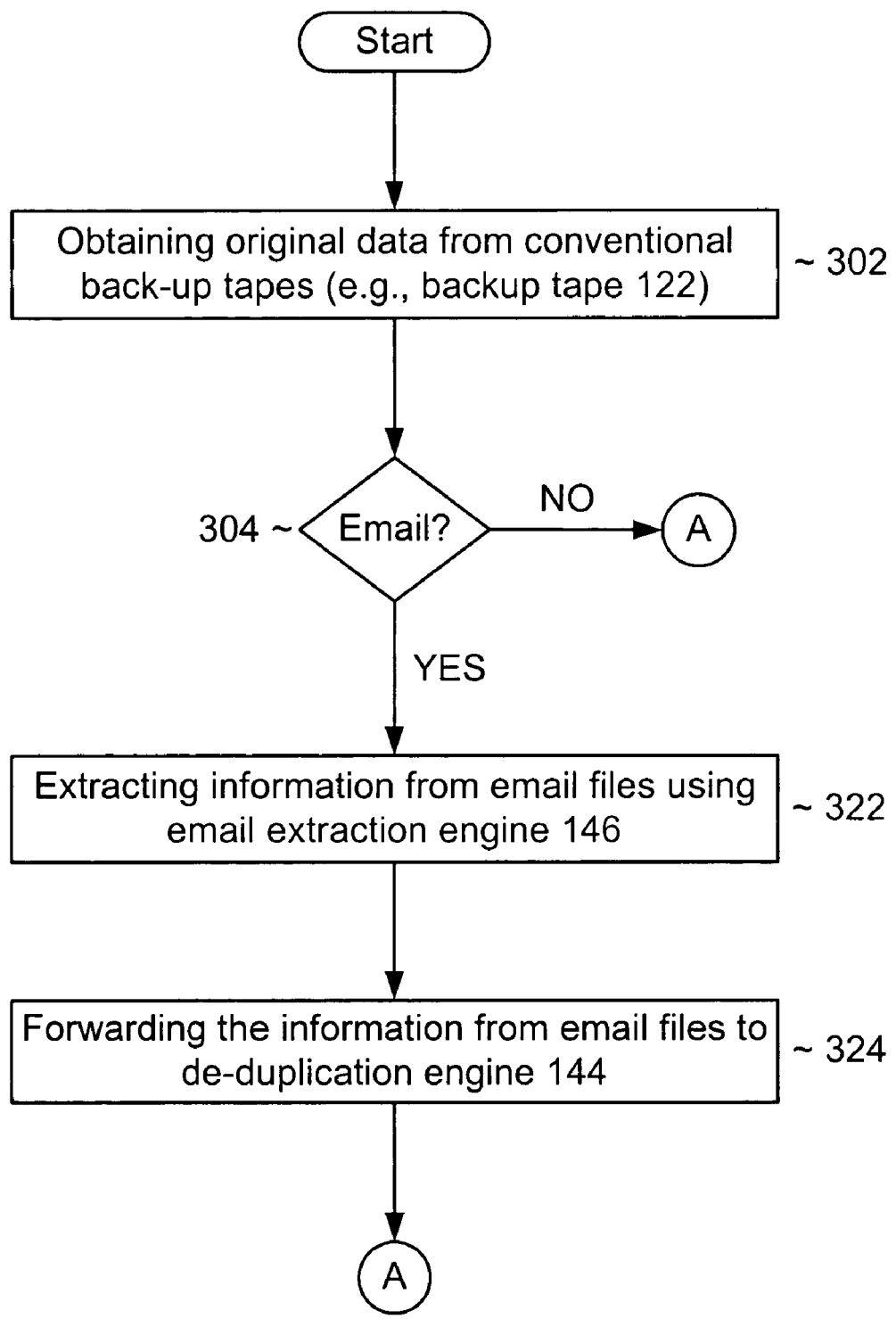
FIGS. 3-6 includes a detailed flow diagram of the method illustrated in FIG. 2 in accordance with an embodiment of the present invention.

Starting with backup tape 122, the method includes obtaining original electronic data from conventional back-up tapes (e.g., backup tape 122) at step 302 in FIG. 3. File extraction engine 142 can be used to perform this activity. The file extraction engine 142 can examine the first part of tape backup 122 to find an "identifying signature" of the backup environment used to create backup tape 122. After the backup environment has been identified, file extraction engine 142 can use a look-up table to determine the format used to store data on backup tape 122. The information in the table can include the backup system used to generate backup tape 122, the protocol used for the backup tape 122, notations for determining how individual files and other records are stored on the tape, and the like. This "non-native" file extraction can occur without having to recreate the backup environment used to create backup tape 122 as further described in the Gardner Application. Alternatively, any method that can obtain the original data from the backup tape 122 can be used.

As each file from backup tape 122 is examined, file extraction engine 142 determines whether the file is an email file or another type of file at step 304 in FIG. 3. In one embodiment, the email files may be Exchange Database ("EDB") files. The email files can be forwarded to email extraction engine 146, and the other non-email files may be forwarded to de-duplication engine 144. In another embodiment only EDB files are forwarded to email extraction engine 146, and all other email files (e.g., Lotus Notes files), represented by the "NO" branch of step 304, may be sent with the other non-email files to de-duplication engine 144.

The method can continue with extracting information from email files using email extraction engine 146 at step 324. Email extraction engine 146 can perform the extraction, which allows information to be obtained from the EDB files without having to create or re-create individual email accounts (.pst files). Because the format of the EDB files is known, the extraction can be performed in a similar method to extracting files from backup tape 122 using file extraction engine 142. insert. The extracted email filed from email extraction engine 142 can then be forwarded to de-duplication engine 144. Because the number of duplicate copies of files (including email filed) stored on backup tapes or in the network can be very large, an automated de-duplication operation can be performed by de-duplication engine 144 to detect duplicate copies. The de-duplication process is described more fully later in this specification using the example of an electronic file.

The method can then comprise storing the information from email files in collective database 162 at step 324. Additional steps may be performed for the email electronic information after it is in collective database 162, such as those subsequently described starting at step 522 in FIG. 5. Before addressing those steps, getting electronic information from network 124 is described.

Figure 4:
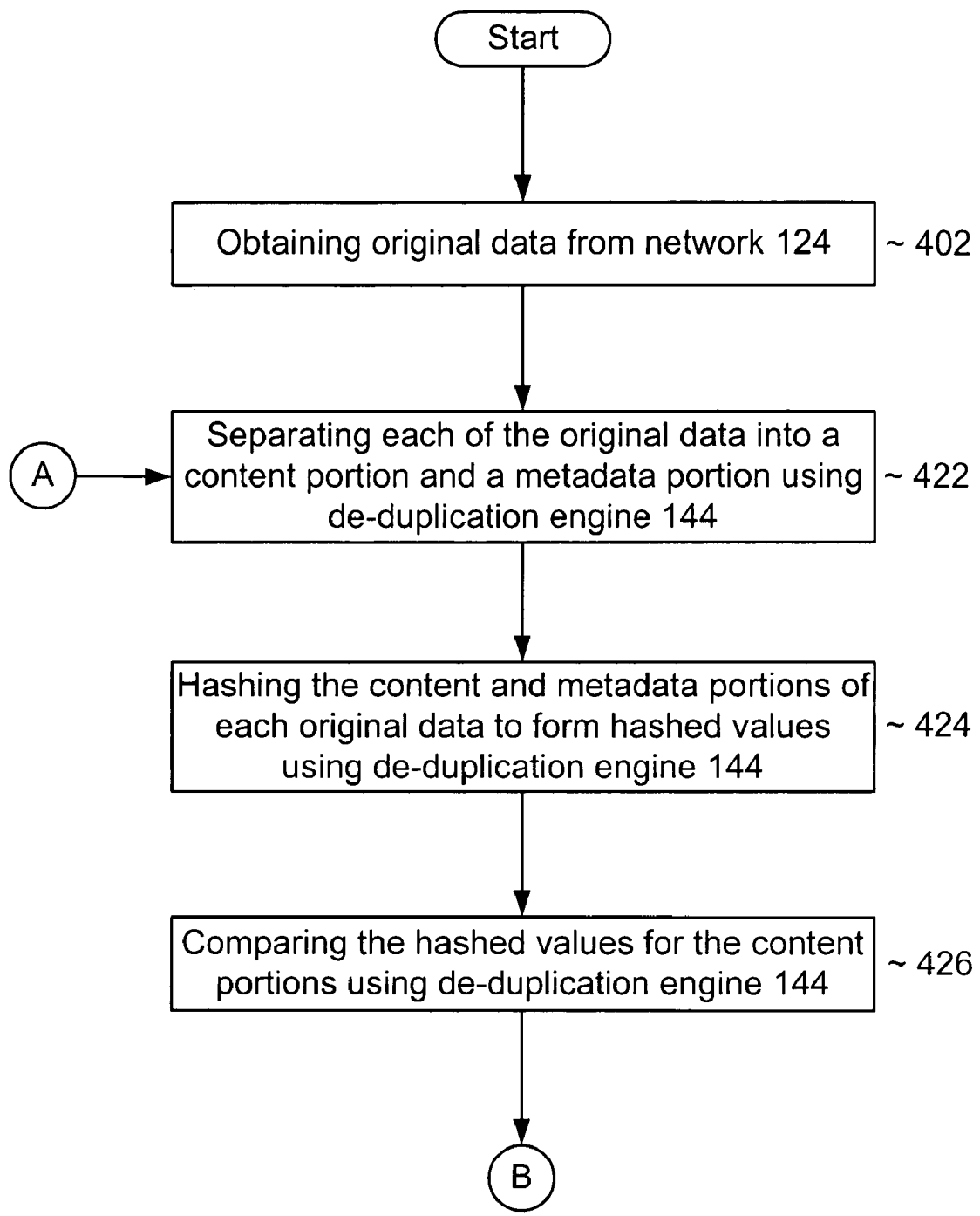

Referring to network 124, the method can comprise obtaining original electronic data from network 124 at step 402 in FIG. 4. In one embodiment, only EUI from network 124 is forwarded to de-duplication engine 144. In other embodiments, additional or less data from network 124 is forwarded to or obtained by de-duplication engine 144. Also, non-email files (from step 304 in FIG. 3) from file extraction engine 142 are forwarded to or obtained by de-duplication engine 144.

Not all of the original data will necessarily be stored in collective database 162 because many copies of an electronic file, electronic mail message, database record, or other electronic data file may exist on many different computers in any network or within a plurality of databases or both backup tape 122 and network 124. Because the number of duplicate copies may be very large, an automated de-duplication operation can be performed by de-duplication engine 144 to detect duplicate copies. An example of an electronic file will be used to describe the de-duplication operation performed by de-duplication engine 144. Similar methods can be used for electronic mail messages, database records, and other electronic data. De-duplication may be performed on data from backup tapes 122, network 124, or both.

In one the embodiment, the de-duplication operation, as performed by de-duplication engine 144, can comprise separating each of the original data into a content portion and a metadata portion at step 422. For a file, the metadata portion may include an Internet Protocol address or other address of a computer from which the file is obtained. Additional data within the metadata portion may include the file path and filename, date the file was last saved on that particular computer, a pointer to the content portion within that computer, size of the file, and the like.

The method can further comprise hashing at least a portion of the content and metadata portions of each original data to form hashed values using de-duplication engine 144 at step 424. One hashed value corresponds to the content portion, and another hashed value corresponds to the metadata portion.

For at least the content portion of each file, the length of the hashed value should be sufficiently large enough to reduce the likelihood that a file with a different content portion would have the same hashed value. In one embodiment, the hashed value may be a 160-bit hash. In other embodiments, more or fewer bits may be used as appropriate. A lower number of bits may incrementally reduce the processing time, however, as a lower the number of bits is used, the risk that different content portions of two different files are improperly detected as having the same content is greater. Skilled artisans may choose the length of the hashed value according to the desires of their particular enterprise.

After reading this specification, skilled artisans realize that the foregoing are simply examples of the de-duplication embodiments and de-duplication can be implemented in a variety of different manners. In one embodiment, the hash of the content or metadata portion may be performed on only a portion of the content or metadata, respectively. For example, the hash of the metadata portion may be performed on the creation date, author, type of document, originating department, or nearly any other attribute of the metadata, by itself, or in combination with other attributes. Similarly, any portion of the content portion may be used for creating a hash value using the hashing algorithm. In addition, any number of hashes may be performed (e.g., hashing at least two hashed values to generate another hashed value). Still further, the hash can be formed from combination(s) of portions or all of the content and metadata. Still further, a different hash algorithm may be used. After reading this specification, skilled artisans will appreciate that listing every possible embodiment would be nearly impossible and that many other methodologies may be used to replace or in conjunction with those described herein without departing from the scope of the invention.

The method can further comprise comparing the hashed values for the content portions using de-duplication engine 144 (step 426). For previously collected data within collective database 162, the de-duplication engine 144 compares the hashed values for those previously collected data files' content portions are stored within database 162. Before storing the content portion of a current electronic file within database 162, the hashed value for the content portion of the current file is compared to hashed values of the content portions of other previously stored files within database 162. If a match is not found, the method can comprise storing a copy of the content portion in collective database 162 at step 502 in FIG. 5. If a match between hashed values is found, the content portion is already within database 162. In one embodiment, rather than storing multiple copies of the same content portion, only one copy of the content is stored within collective database 162.

Regardless whether the hashed values for the content portion match, the method can include storing each copy of the metadata for each content portion in collective database at step 504. For duplicate files, the metadata saved for the current duplicate file can have a pointer or link to the content portion of the previously stored copy of the file within database 162. In this manner, only one copy of content portion is retained in database 162, which at the same time, all the metadata portions (including pointers to proper content portions within database 162) for each copy are stored within collective database 162. Within collective database 162, the hashed values for the content and metadata portions can be the keys, and the content portion and the metadata portion can be the values corresponding to the keys. This is known as "single instance de-duplication" because regardless of the course of the content portion (e.g., from a file, an attachment to a file, a loose file, different locations (e.g., on a network source and on a back-up tape source)), only one instance of the content is stored in the collective database 162, and each of the instances of metadata associated with each file that contained the content portion is stored in the collective database 162. It should be understood that other variations could also be achieved and accomplished using the invention. For example, a subset of each metadata portion could be maintained if, for example, the file did not meet a rule and the metadata should not be stored in the collective database. Further, something greater than single instance de-duplication could occur; for example, presume 10 instances of a particular content portion exist on both network and back-up tape sources within 4 different files (one loose file, on attachment, and two with different file names). The de-duplication engine could have a rule that instances that are attachments must be maintained in the collective database 162. Therefore, two instances of the content portion (out of ten total) and all instance of metadata portions associated with those content portions would be stored in the collective database 162. This would still provide an advantage over current systems that would only have eliminated 6 instances (not 8 as with this example).

The de-duplication operation can be automatically performed by de-duplication engine 144 without any human intervention. Therefore, manual intervention, including manually deleting, manually examining records for copies of files, or sending notices to one or more persons having a copy of the duplicate file is unnecessary. For large enterprises, an automated de-duplication operation may be the only practical choice for dealing with duplicative files.

Although electronic files have been described, the de-duplication process can be extended to other electronic data. If electronic communications are involved, the electronic communication may include a header portion as a metadata portion and a separate content portion. For database records, a tuple from one database table may be used as a content portion. Alternatively, an entire table may be used as a content portion. After reading this specification, skilled artisans will appreciate that many other methods may be used to process automatically the duplicate files, electronic mail messages, database records, and potentially nearly any other electronic data.

At this point in the process, collective database 162 has been generated (i.e., step 242 in FIG. 2 has been performed). Collective database 162, in this embodiment, includes data obtained from network 124 in addition to data obtained from backup tapes 122. Theoretically, collective database 162 comprises (1) a single copy of the content portion for each file, electronic mail message, database entries, and other electronic data and (2) all copies of metadata portions for those content portions.

In an alternate embodiment, some of the information from network 124 ("Other files" as illustrated in FIG. 1) may not be sent to collective database 162. That information may be backed up from network 124 using a conventional process. For example, a user may not desire to store back-end data (such as financial accounting information) in collective database 162.

After generating collective database 162, many different applications may be performed using data within collective database 162. In the embodiment of FIG. 2, the method can include identifying at least one of compliant data and targeted data within collective database 162 using a rule. The rule may include any one or more of filters, business rules, queries, policies, and the like. Some non-limiting, exemplary applications are described below and include implementation of a data retention policy, setting up a legal repository, and performing intelligence gathering. After reading this specification, skilled artisans will appreciate that many more applications are possible and would nearly impossible to list them all.

Figure 5:
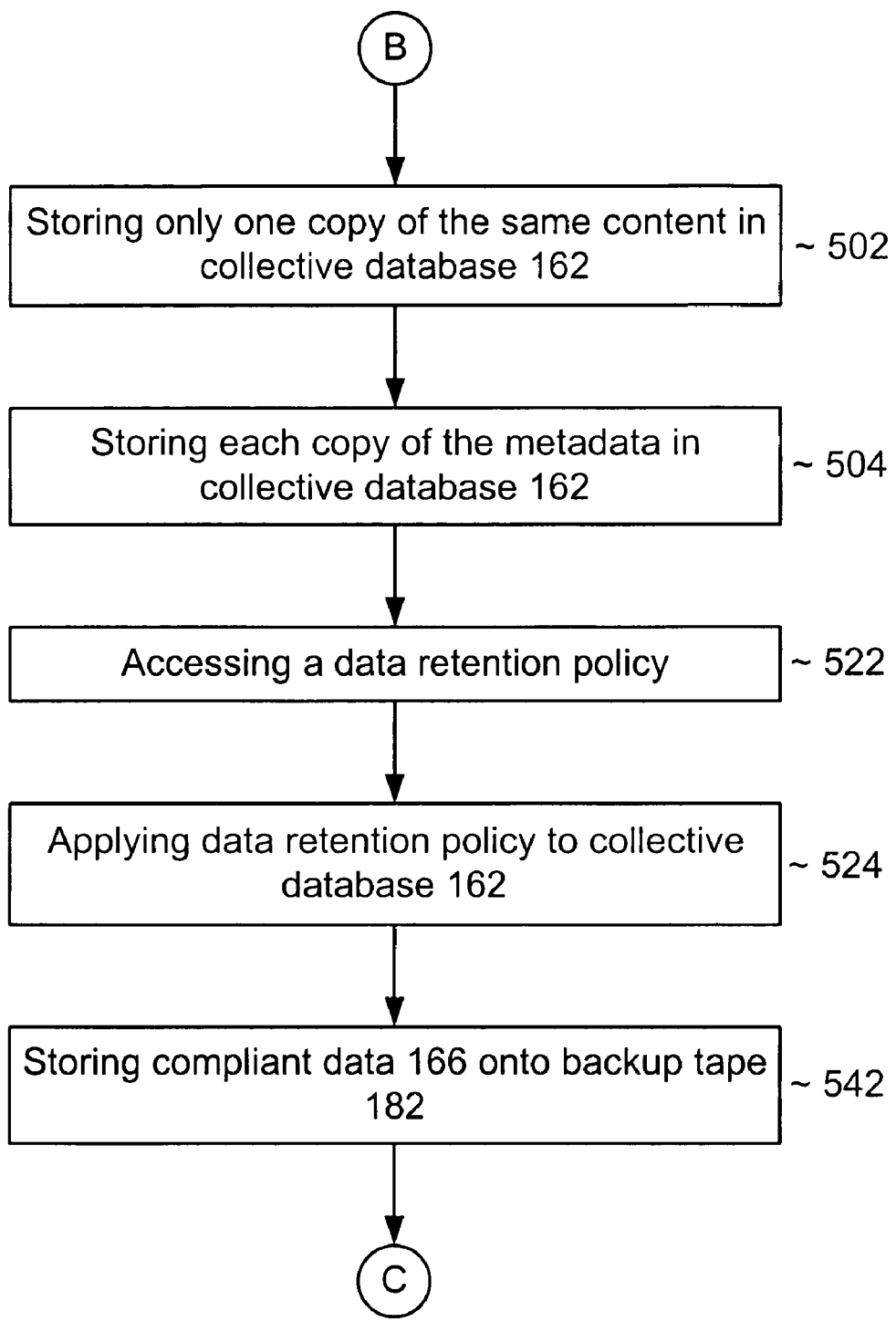
Figure 6:
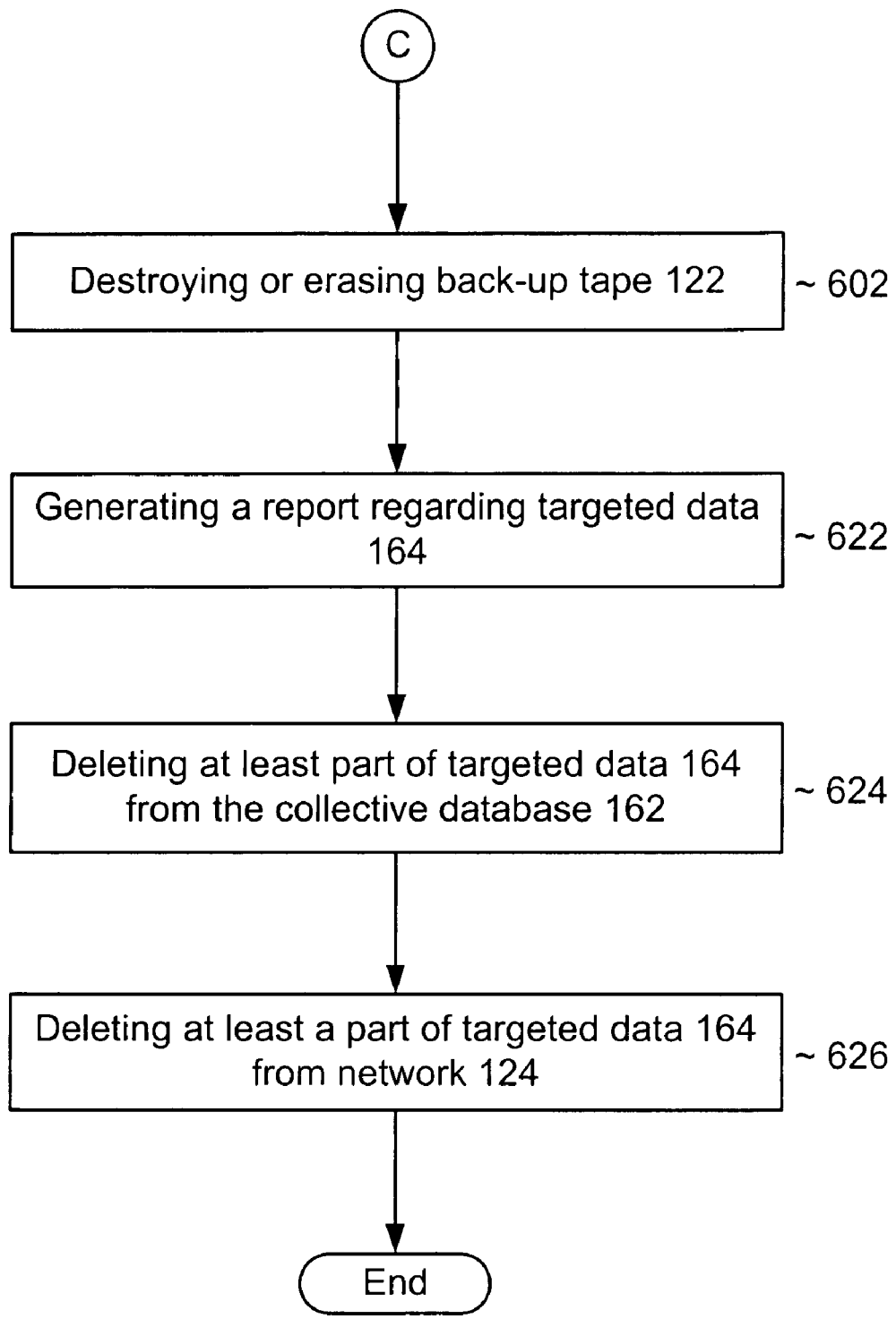

In one application, a data retention policy may be implemented using system 100 and is described with respect to steps starting at step 522 in FIG. 5. The retention policy is a set of criteria against which original electronic data (from the tapes 122, network 124, or both) is reviewed and only the original electronic data that meets the criteria (or alternatively fails to meet the criteria) is stored (or alternatively, deleted from) the database 162. As one example, a retention policy may include a requirement that all documents more than five years old be destroyed. After reading this specification, skilled artisans will appreciate that they can tailor the retention policies for many different criteria, including types of documents, department files were created within, divisions within the company, or by nearly any other criteria. The number and types of retention policies may vary within a single enterprise.

In this application, backup tape 182 may be generated to contain electronic data that complies with a retention policy. Report generation regarding targeted data 164 (non-compliant data) and other activities may be performed as described below in more detail.

In the embodiment illustrated in FIG. 5, the method includes accessing a data retention policy at step 522. The data retention policy may already reside in collective database 162 or be in memory of a server (not shown) for collective database 162.

The data retention policy rules can then be applied to collective database 162 in step 524. The server for collective database 162 may examine the metadata portion, content portion, or both for each file, message, or other electronic data within collective database 162 to determine if the file complies with (compliant data 166) or does not comply with (targeted data 164). Typically only one of targeted data 164 and compliant date 166 is identified with an assumption that all other information is of the other type.

The method can further comprise storing compliant data 166 onto backup tape 182 at step 542. After the compliant data have been stored onto backup tape 182, the method can comprise destroying or erasing prior backup tape 122 at step 602 in FIG. 6. Backup tape 182 can now replace backup tape 122 in FIG. 1, and the data management process can be run again. Because all data from prior backup tapes 122 has been collected within collective database 162, the portion of the system that extracts data from backup tapes is no longer needed in one embodiment. The process of backing up data from network 124 may be performed in an iterative process that can be run at any user-defined time interval (e.g., once a day).

The method can also comprise generating a report regarding targeted data 164 at step 622. The report may be generated by the server for collective database 162 and include targeted data 164 may include identification all of files, messages, records, or other data that do not (or alternatively that do) comply with the data retention policies. The report may be used to audit the enterprise via system 100 using collective database 162 to ensure the data retention policies are being properly applied. In another application, the metadata for targeted data 164 may be used to send a message to the user of the computer or owner of the database that the user's data files do not comply with the particular policies. The message may be automatically generated by a server for collective database 162 and sent to the user by accessing the metadata portion of the file (e.g., includes and IP or other network address). In another embodiment, an employee records database may be used to send the same or a similar message to that user's supervisor so that the supervisor is aware of the targeted data 164 and noncompliance by the user. Many other uses of the report are possible.

The method can comprise deleting at least part of targeted data 164 from collective database 162 at step 624. The deletion of the targeted data 164 may be performed automatically using at the server for collective database 162, or may be performed with some human intervention to ensure that compliant data 166 is not inadvertently designated as being targeted data 164. The report (as described with step 622) may also be used to determine if targeted data 164 should still be maintained even though it does not comply with data retention policies.

The method can still further comprise deleting at least a part of targeted data 164 from network 124 at step 626. The deletion of the targeted data 164 may be performed automatically, using at least in part, the server for collective database 162 with or without the assistance of software agent(s) on network 124, with human intervention, or a combination of the two. Original data from network 124 may include metadata or other information to override an automatic deletion command if such original data would be targeted data 164 within collective database 162, even if such original data do not comply with a data retention policy. For example, a computer (not shown) within a legal department may need to have a copy of an old contract that is currently the subject of litigation. During a routine backup of the computer, a copy of the file may be made on network 124. The file itself may have been otherwise deleted because it may be noted as a contract that is more than five years old. However, the file may need to be retained for discovery or other legal requirements. In still another embodiment, all targeted data 164 may be deleted from network 124. After reading this specification, skilled artisans will understand what, if anything, should be deleted, and how much of the deletion on network 124 is to be automated.

In one embodiment, the activities in step 626 may be performed to synchronize the information within network 124 to collective database 162. If the same portion or all of targeted data 164 are removed from both collective database 162 and network 124, the two systems may be deemed to be synchronized. Synchronization may be potentially extended to computers coupled to network 124.

Note that deleting parts of targeted data 164 in step 624 and 626 may be for the same or different parts of targeted data 164. For example, all targeted data 164 within collective database 162 may be deleted regardless whether any or all corresponding targeted data within network 124 is deleted.

The description above has focused on generating collective database 162 from conventional backup tapes and a network 124. In one embodiment, the next time a backup is performed using collective database 162, conventional backup tapes do not need to be input because the contents of collective database 162 should have all the data from the prior backup, currently on backup tape 182. Therefore, the conventional tape backup operation does not need to be performed, and the method can start at step 402 in FIG. 4 for the next back up (i.e., skip the activities in FIG. 3).

In alternate embodiments, the retention policy may be applied at a different time. The retention policy may be applied before electronic data enters collective database 162 (e.g., collective database 162 comprises compliant data 166 but not targeted data 164). The retention policy could be applied by a database server (not shown) to data before reaches collective database 162. In this manner, storing and later deleting targeted data collective database 162, thereby, improving speed and saving resources. Alternatively, the retention policy could be applied earlier, for example, using file extraction engine 142, de-duplication engine 144, email extraction engine 146, or any combination thereof. A report could still be generated noting which files and other records do not comply with the data retention policies, and for each file or record, the location of the file or record and the policy that is violated.

In another application, the rule may be related to a legal discover request. When a discovery request is received, all files, regardless whether they are compliant data 166 or targeted data 164 may need to be saved. Instead of using the retention policies, the criteria for a search of files, messages, records, or other data may be defined. The criteria may include queries based on the names of the parties involved, the individuals knowledgeable regarding the matter, the subject matter involved, or any other criteria. Information regarding the lawsuit may be stored on a persistent memory source (not shown) and the maintained separate from compliant data 166. This "litigation-related" data would then be targeted data 164 in this example. Targeted data 164 related to the lawsuit may be stored within a tape or other persistent data storage medium different from backup tape 182 and still be deleted from collective database 162 after targeted data 164 for the lawsuit has been stored. In this manner, targeted data 164 that falls within the "parameters" of the lawsuit may still be maintained while having collective database 162 only storing and maintaining compliant data 166.

In still another application, the rule can be used to verify the authenticity of a document. Each file or other record has its content and metadata portions processed using a hashing function. If the content of the file or record has been altered, the hashed value for the content will be changed. If the hashed value as stored in collective database 162 or on backup tape 182 differs from the hashed value on network 124 or other computer connected to system 100, the files or records are different. Therefore, data integrity and the likelihood of detecting evidence tampering significantly increase.

In yet other applications, the rule can be used to query collective database 162 to obtain information for nearly any purpose. For example, a researcher at one location of the enterprise may discover related work performed by another researcher at a different location of the enterprise. Such information can prevent duplicating costly experiments. The query may also identify others to form symbiotic relationships within the enterprise in performing research, development, or other work.

To aid in the formulation and application of rules, interfaces, such as a graphical user interface, can be used to communicate with any one or more of file extraction engine 142, de-duplication engine 144, and email extraction engine 146, and the server for collective database 162, or other part of system 100. The interfaces can provide a more user friendly way for users to interact and use system 100.

In one embodiment, a portion of collective database 162 may be used as a legal repository. A portion of collective database 162 may include files or other records related to a legal matter. A first graphical user interface ("GUI"), which will be called an administrator GUI or a legal GUI, may be used to extract files, records, and other electronic data (e.g., based or contain criteria/rules/keywords) from the collective database 162 before targeted data 164 is removed. The legal GUI may be used to define the criteria for determining which information is to be put into a legal repository for a specific legal matter. The criteria may be based on subject matter, departments or other divisions within a company, individuals, types of files or records, specific tables from databases, other attributes, or combination(s) of thereof. All the data from collective database 162 meeting the criteria can be used form at least part of the legal repository.

Note that the legal repository may include data for other legal matters, where such data are collected in a similar fashion. Optionally, the de-duplication process may be used to filter duplicates of the same file, record, or other electronic data. Because in litigation and other legal procedures, evidence typically needs to be preserved, a data retention policy would not be applied to this database until after the legal matter(s) has (have) concluded. If any file, record, or electronic data is used for more than one legal matter, the file, record, or electronic data will not be deleted until all legal matters using that information have concluded.

Internet capability may be added to the legal repository. A second or hosting GUI can be added to allow authorized users access to the legal repository (or any other "targeted data" database) via a browser program at the users' computers (not shown) via network 124. If the system is configured to differentiate evidence data from other files, records, or electronic data (e.g., pleadings, answers, discovery requests, work-product memorandum, and the like), authorized users may be allowed read-only access to the evidence data and read and write access to the other information. After a document is filed with a court or served on opposing council, write access privileges to the file corresponding to that document may be revoked. Users inside or outside the enterprise may be allowed access to portion(s) of the legal repository. Additionally, different users may be granted different levels of authorization. For example, users inside the enterprise may be allowed read and write access, whereas users outside the enterprise may be allowed read access for only a specific legal matter. Many variations are possible without departing from the scope of the invention. The embodiments creating and using the legal repository may be an integral part of case management tools.

Yet another GUI may be used to allow authorized users access to collective database 162. The GUI for collective database 162 may be similar to the hosting GUI as previously described. In one embodiment, only read access may be granted to the authorized users to substantially prevent spoilage of data within database 162.

In one embodiment, database 162 may be queried using the GUI before entering negotiations on a matter to assess more accurately upside and downside potential before going proceeding. Also, database 162 may be queried to determine exposure or other information before answering a complaint from another party in a lawsuit or responding to an investigation by a regulatory agency. Simply put, the ability to query collective database 162 allows an enterprise to make more informed decisions.

The method and system described are highly beneficial over conventional methods and systems because electronic data from a wide variety of sources can be used to form collective database 162. The electronic data may originate from backup tapes 122, network 124, or potentially other sources. The electronic data within the backup tapes 122 can be extracted without having to recreate the backup environment, email environment, or individual email accounts. Also, data from many backup tapes 122 and network 124 may be extracted simultaneously to speed up the data collection process in forming collective database 162.

Additionally, an automated de-duplication operation can be used to reduce the number of copies of a content portion of different files, messages, records, or other electronic data that have the same content portion. The metadata portion for each copy is retained, however, only one copy of the content portion is retained. By automating the operation, the de-duplication operation can occur real-time without any human intervention.

The method and system are also beneficial in that the database server used with the collective database 162 may forward information regarding targeted data 164 back to network 124 to delete part or all targeted data 164 from network 124. Therefore, at least some automated deletion of targeted data 164 can occur and increase the likelihood that an enterprise is compliant with its data retention policies. An enterprise may be able to prove to a court that evidence was not destroyed after first learning about a litigation or other investigative matter.

In the foregoing specification, the invention has been described with reference to specific embodiments. However, one of ordinary skill in the art appreciates that various modifications and changes can be made without departing from the scope of the present invention. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of the invention.

What is claimed is:

1. A method, performed by a computer system, for managing information associated with an enterprise, the method comprising the steps of:
obtaining original data from a plurality of different electronic data sources including at least two electronic data sources including a backup tape data source and a networked data source, wherein the original data includes a plurality of files having content portions and metadata portions;
determining email files within the original data;
extracting information from the email files using an email extraction engine;
forwarding the information extracted from the email files to a de-duplication engine;
separating the information extracted from the email files and other original data in content portions and metadata portions;
analyzing the content portions and the metadata portions by hashing the content portions of the information extracted and the other original data to form hashed values using a de-duplication engine and comparing the hashed values using the de-duplication engine;
placing, into a collective database, at least a single copy of unique content portions; and
placing, into a collective database, at least one copy of the metadata portions including information on where the files were obtained;
from a user of the computer system, receiving at least one rule, including: a retention policy for the data; and a query for the data, wherein the query is other than a search for duplicate portions of the data;
using the rule, which includes a logical operation to segregate the targeted data and the compliant data from other data, identifying: compliant data that comply with the retention policy; and targeted data that correspond to the query; and
using the rule, preserving the compliant data and the targeted data within the collective database, while deleting at least a portion of other data that are neither compliant data nor targeted data within the collective database.

2. The method of claim 1, further comprising storing the targeted data in a persistent memory source.

3. The method of claim 2, further comprising performing the steps of claim 1 and claim 2 on a periodic basis on different data sources.

4. The method of claim 1, wherein the data source comprises a network, and further comprising deleting the other data from the network.

5. The method of claim 4, wherein the data source comprises a backup tape.

6. The method of claim 5, further comprising deleting the backup tape.

7. The method of claim 5, wherein extracting the data comprises extracting the data from the backup tape without recreating a backup environment used for generating the backup tape.

8. The method of claim 1, wherein the query for the data includes a query of at least one of the following for the data: subject matter, author, type, and content.

9. The method of claim 1, wherein the data include files having content portions and metadata portions, and wherein the files can be different file types, and, prior to collecting the data within the database, further comprising the steps of:
analyzing the content portions;
placing, into the database, less than the total number of copies of unique content portions per file type; and
placing, into the database, at least one copy of the metadata portions including information regarding from where the files were obtained.

10. The method of claim 1, further comprising the step of: auditing the database to determine data existing in the database that meet or do not meet a certain rule.

11. The method of claim 1, further comprising the step of: outputting a subset of the data in the database to a different database.

12. The method of claim 1, wherein the extracting operation includes extracting new data from another data source.

13. A method, performed by a one or more computer systems, for managing information associated with an enterprise, the method comprising the steps of:
    extracting specific data from original data obtained from at least two different data sources including a backup tape data source and a networked data source, wherein the specific data contains at least a content portion and a metadata portion, by first separating email data from the original data and extracting information from the email data and forwarding the information to a de-duplication engine;
    separating the content portion from the metadata portion for the information from the email data and other original data;
    analyzing the content portions;
    placing, into a collective database, at least a single copy of unique content portions;
    placing, into the collective database, at least one copy of the metadata portions including information on where the files were obtained;
    collecting the specific data within a collective database, wherein the collective database includes one copy of the content portion of the specific data and different copies of the metadata portion including information regarding from where the specific data was obtained;
    from a user of the computer system, receiving at least one rule, including: a retention policy for the data; and a query for the data, wherein the query is other than a search for duplicate portions of the data;
    using the rule, identifying: compliant data that comply with the retention policy; and targeted data that correspond to the query; and
    using the rule, preserving the compliant data and the targeted data within the database, while deleting at least a portion of other data that are neither compliant data nor targeted data within the database.

14. The method of claim 13, wherein extracting the data comprises extracting the data from the backup tape without recreating a backup environment used for generating the backup tape.

15. The method of claim 13, further comprising storing the targeted data in a persistent memory source.

16. The method of claim 13, wherein the at least two different data sources comprise a network, and further comprising deleting the other data from the network.

17. The method of claim 13, wherein the query for the data includes a query of at least one of the following for the data: subject matter, author, type, and content.

18. A method, performed by a computer system, for managing information associated with at least one enterprise, the method comprising:
    extracting data from at least two data sources, a backup tape data source and a networked data source, wherein the extracted data include files have content portions and associated metadata portions;
    determining email files within the original data;
    extracting information from the email files using an email extraction engine;
    forwarding the information extracted from the email files to a de-duplication engine;
    separating the information extracted from the email files and other original data in content portions and metadata portions;
    analyzing the content portions and the metadata portions by hashing the content portions of the information extracted and the other original data to form hashed values using a de-duplication engine and comparing the hashed values using the de-duplication engine;
    placing, into a collective database, at least a single copy of unique content portions;
    placing, into the collective database, at least one copy of the metadata portions including information on where the files were obtained;
    storing unique content portions in the collective database;
    storing the metadata portions in the collective database including information linking the metadata portions to their associated content portions;
    from a user of the computer system, receiving at least one rule, including: a retention policy for the data; and a query for the data, wherein the query is other than a search for duplicate portions of the data;
    using the rule, identifying: compliant data that comply with the retention policy; and targeted data that correspond to the query; and
    using the rule, preserving the compliant data and the targeted data within the collective database, while deleting at least a portion of other data that are neither compliant data nor targeted data within the collective database.

19. The method of claim 18, wherein extracting the data comprises extracting the data from the backup tape without recreating a backup environment used for generating the backup tape.

20. The method of claim 18, further comprising storing the targeted data in a different database.

21. The method of claim 18, wherein the extracting includes extracting new data from another data source.

22. The method of claim 18, and further comprising the step of: deleting the other data from the networked data source.

23. The method of claim 18, wherein the query for the data includes a query of at least one of the following for the data: subject matter, author, type, and content.

24. The method of claim 18, further comprising auditing the collective database to determine data existing in the collective database that meet or do not meet a certain rule.

25. The method of claim 18, further comprising performing the steps of claim 24 on the data source on a periodic basis.

26. A method utilizing a computer for executing instructions stored on a computer readable medium having software code embodied therein for managing information, the software code comprising computer-executable instructions for:
    extracting data from at least two data sources, a first backup tape data source and a second networked data source;
    determining email files within the original data;
    extracting information from the email files using an email extraction engine;
    forwarding the information extracted from the email files to a de-duplication engine;
    separating the information extracted from the email files and other original data in content portions and metadata portions;
    analyzing the content portions;
    placing, into a collective database, a single copy of unique content portions; and
    placing, into a collective database, at least one copy of the metadata portions including information regarding from where the files were obtained;

from a user of the computer system, receiving at least one rule, including: a retention policy for the data; and a query for the data, wherein the query is other than a search for duplicate portions of the data;

using the rule, identifying: compliant data that comply with the retention policy; and targeted data that correspond to the query;

storing the targeted data in a persistent memory source; and using the rule, preserving the compliant data and the targeted data within the database, while deleting at least a portion of other data that are neither compliant data nor targeted data within the database.

27. The method of claim 26, wherein the software code further comprises at least one instruction for performing the steps of claim 26 on a periodic basis on different data sources.

28. The method of claim 26, wherein the software code further comprises at least one instruction for deleting the other data from the backup tape data source, the networked data source or both.

29. The method of claim 26, wherein the data source comprises a backup tape, and wherein extracting the data comprises extracting the data from the backup tape without recreating a backup environment used for generating the backup tape.

30. The method of claim 26, wherein: the rule is a query; and
the targeted data comprise a portion of the data within the database, wherein the targeted data correspond to the query.

31. The method of claim 26, wherein the data include files having content portions and metadata portions, and wherein the files can be different file types, and wherein the software code further comprises at least one instruction for, prior to collecting the data within the database:
analyzing the content portions;
placing, into the database, less than the total number of copies of unique content portions per file type; and
placing, into the database, at least one copy of the metadata portions including information regarding from where the files were obtained.

32. The method of claim 26, wherein the software code further comprises at least one instruction for outputting a subset of the data in the database to a different database.

33. The method of claim 26, wherein the extracting step includes extracting new data from another data source.

34. A method for executing operations in accordance with instructions stored on a computer readable medium having software code embodied therein for managing information, the software code comprising computer-executable instructions for:
extracting original data from at least two different data sources, a backup tape data source and a networked data source and another data source;
determining email files within the original data;
extracting information from the email files using an email extraction engine;
forwarding the information extracted from the email files to a de-duplication engine;
separating the information extracted from the email files and other original data in content portions and metadata portions;
analyzing the content portions;
placing, into a collective database, a single copy of unique content portions; and
placing, into a collective database, at least one copy of the metadata portions including information regarding from where the files were obtained;
collecting the data within a collective database;
from a user of the computer system, receiving at least one rule, including: a retention policy for the data; and a query for the data, wherein the query for the data includes a query of at least one of the following for the data: subject matter, author, type, and content;
using the rule, identifying: compliant data that comply with the retention policy; and targeted data that correspond to the query; and
using the rule, preserving the compliant data and the targeted data within the database, while deleting at least a portion of other data that are neither compliant data nor targeted data within the database.

35. The method of claim 34, wherein extracting the data comprises extracting the data from the backup tape without recreating a backup environment used for generating the backup tape.

36. The method of claim 34, wherein the software code further comprises at least one instruction for storing the targeted data in a persistent memory source.

37. The method of claim 34, wherein the at least two different data sources comprise a network, and wherein the software code further comprises at least one instruction for deleting the other data from the network.

38. The method of claim 34, wherein: specific data include a content portion and a metadata portion; and the database comprises:
one copy of the content portion of the specific data; and
different copies of the metadata portion including information regarding from where the specific data was obtained.

39. A method of executing operations based on a computer readable medium having software code embodied therein for managing information, the software code comprising computer-executable instructions for:
extracting data from at least two different data sources, wherein the extracted data include files having content portions and associated metadata portions;
determining email files within the original data;
extracting information from the email files using an email extraction engine;
forwarding the information extracted from the email files to a de-duplication engine;
separating the information extracted from the email files and other original data in content portions and metadata portions;
storing unique content portions in a collective database;
storing the metadata portions in the collective database including information linking the metadata portions to their associated content portions;
from a user of the computer system, receiving at least one rule, including: a retention policy for the data; and a query for the data, wherein the query is other than a search for duplicate portions of the data;
using the rule, identifying: compliant data that comply with the retention policy; and targeted data that correspond to the query; and
using the rule, preserving the compliant data and the targeted data within the collective database, while deleting at least a portion of other data that are neither compliant data nor targeted data within the collective database.

40. The method of claim 39, wherein:
the data source comprises at least two data sources, wherein a first data source is at least one backup tape and a second data source is a network.

41. The method of claim 40, wherein extracting the data comprises extracting the data from the backup tape without recreating a backup environment used for generating the backup tape.

42. The method of claim 39, wherein the software code further comprises at least one instruction for storing the targeted data a different database.

43. The method of claim 39, wherein the extracting includes extracting new data from another data source.

44. The method of claim 39, wherein the data source comprises at least two data sources, wherein a first data source is one or more backup tapes and a second data source is the networked database, and wherein the software code further comprises at least one instruction for deleting the other data from the network.

45. The method of claim 39, wherein the software code further comprises at least one instruction for auditing the collective database to determine data existing in the collective database that meet or do not meet a certain rule.

46. The method of claim 39, wherein the software code further comprises at least one instruction for performing the steps of claim 39 on the data source on a periodic basis.

47. The method of claim 39, wherein the query for the data includes a query of at least one of the following for the data: subject matter, author, type, and content.

* * * * *